METHOD FOR INCREASED DATA RATE IN TRANSMISSION OVER TIME-VARYING MULTIPLE PATHS

Filed Feb. 6, 1967 3 Sheets-Sheet 1

INVENTOR.
WALTER J. ALBERSHEIM
BY Harry A. Herbert Jr.
ATTORNEY
Henry S. Miller Jr.
AGENT INVENTOR.
WALTER J. ALBERSHEIM
BY Harry A. Herbert Jr
ATTORNEY
Henry S. Miller Jr
AGENT Aug. 11, 1970 W. J. ALBERSHEIM 3,524,136

METHOD FOR INCREASED DATA RATE IN TRANSMISSION OVER TIME-VARYING MULTIPLE PATHS

Filed Feb. 6, 1967 3 Sheets-Sheet 3

INVENTOR.
WALTER J. ALBERSHEIM

BY Harry A. Herbert Jr.
ATTORNEY

Henry S. Miller Jr.
AGENT

United States Patent Office 3,524,136
Patented Aug. 11, 1970

3,524,136

METHOD FOR INCREASED DATA RATE IN TRANSMISSION OVER TIME-VARYING MULTIPLE PATHS

Walter J. Albersheim, Newton, Mass., assignor to the United States of America as represented by the Secretary of the Air Force Filed Feb. 6, 1967, Ser. No. 614,780
Int. Cl. H04b 1/00
U.S. Cl. 325—65 1 Claim

ABSTRACT OF THE DISCLOSURE

The method minimizes the time spread limitation on the speed of data transmission over the time-varying multiple paths by interspersing evenly-spaced pilot pulse signals in isolation gaps between successive message signals and analyzing the complex frequency characteristics of the received pilot pulses. The observed path distortion is corrected by a gate-controlled pulse compression network, thus reducing time gaps with resultant gain in transmission rate.

This invention relates generally to a method for increasing the data rate of transmissions in communications systems, and more particularly to a method for increasing the data rate of transmissions over multiple paths.

Multiple transmission paths occur in several types of communication. In acoustics, they give rise to echoes and to the reverberation and liveness of churches and concert halls.

In electromagnetic microwave communication, interference is experienced between the direct line-of-sight beam and beams reflected from the ground, from trees, hillsides and from tropospheric "inversion layers" in which the refractive index increases with altitude.

In high frequency transmission, interference occurs between waves transmitted directly through the air, waves traveling over the ground, and waves reflected once or several times from the ionosphere. These reflections from the ionosphere are dispersive, so that even for a single sky wave the effective path length varies with frequency.

In point-to-point transmission far beyond the horizon, the communication occurs by forward scatter from fluctuations in the refractivity of the ionosphere or troposphere. This gives rise to a discrete or continuous distribution of paths and path lengths.

The method of this invention is primarily designed to improve long-distance V.H.F. communication with tropospheric forward scatter. In this type of communication the signal is usually transmitted and received by means of highly directive antennas. These form narrow beams pointed in the direction of the great circle path, approximately tangent to the horizon.

According to earlier theories the waves are randomly refracted from turbulent eddies in the troposphere which affect the refractive index by variations in density, temperature and humidity. The fraction of energy deflected per unit volume decreases with the fourth power of bending angle and is so small that the theory assumes a single scatter between two approximately straight rays. The scattering region is effectively limited to the volume common to the intersecting beams of the transmitting and receiving antennas. The scatter is treated as isotropic.

Existing methods for increasing information rate or reducing error rate include narrow band modulation wherein, the bandwidth of amplitude modulation can be reduced by single sideband transmission.

By utilizing double sideband amplitude modulation, the efficiency is increased by depressing or suppressing the carrier in transmission and by enhancing it coherently in the receiver.

These methods are not limited to multipath propagation and are generally applicable to all long-distance communication. An alternative method to those aforementioned is wideband, high modulation index FM. Wideband modulation utilizes the fact that according to information theory the data rate increases faster with bandwidth than it decreases with noise power, as long as $S/N$ is appreciable. High-modulation-index FM utilizes the capture effect: if the signal phase traverses many cycles, it overrides phase distortion by noise and by interfering signals as long as the amplitude of the signal exceeds that of the interference.

High index FM is useful only as long as one "scattering cluster" is more powerful than all others. If two or more scatterers fluctuate past each other's levels, the capture transfer increases the distortion.

Redundancy which is still another method reduces the error rate by multiple transmission of the same information. The oldest form of this is by repetition or time diversity. For instance, it is military practice to repeat a received command and to request repeated transmission of an imperfectly understood message.

A second form is frequency diversity. For example, the double sidebands of ordinary AM constitute a diversity advantage over a single sideband.

In quantized binary data, such as telegraph or teletype, keying by frequency shift or by polarity reversal produces redundancy; instead of deciding on the presence or absence of a single signal, one compares the relative likelihood of two conditions.

In frequency division multiplex, identical information may be transmitted over two or more channels.

A third form is space diversity. If two or more receiving antennas are spaced by more than the correlation distance, the instantaneous amplitudes and phases of their signals are uncorrelated.

If these signals are separately amplified and detected, they constitute redundant data.

In its simplest form, diversity reception accepts the greatest of two or more redundant signals or signal components and rejects all others.

It is better to utilize all the signals with weights corresponding to their relative strengths, that is, their relative amplitude ratio is squared before adding. Addition after detection improves the signal-to-noise ratio significantly only if the individual $S/N$ ratios are greater than one. The best method consists in aligning the carrier phases of all the received signals and summing them, before detection, with weights corresponding to their relative amplitudes.

The aforementioned diverse methods are designed to reduce fading by combining two or more uncorrelated communication channels. They cannot operate on the multiple scatter paths contained within a single channel.

The subject matter of this invention transmits pulse signals with a bandwidth much greater than the reciprocal of the time spread $\tau$ of the scatter paths. These signals are detected by correlation with a properly delayed duplicate of the transmitted signal.

The correlation time is shorter than the time spread by a large factor N:

$$t_{cor}=\frac{\tau}{N}\ (N\gg 1)$$

Hence the total population of scattering elements can be separated into approximately N uncorrelated groups, each of which may be regarded as a separate transmission path. By means of a tapped delay line and of automatic gain and phase controls, the invention sums these paths before detection, with aligned carrier phases and with optimum weighting. This summation increases the average level and signal-to-noise ratio of the received message and reduces the probability of deep fades.

If the scatterers are uniformly distributed over the scattering volume, the average increase in signal power and in the $S/N$ power ratio is N-fold.

It might seem that the increased $S/N$ ratio establishes a higher channel capacity, in accordance with information theory. However, this is not utilizable in this invention because the delay line is as long as the expected time spread, and only one signal at a time must be stored in the delay line in order to avoid summation of echoes from successive pulses, that is smearing and inter-symbol interference. Hence, the data rate remains limited to $1/\tau$ bits per second.

In order to overcome the garbling effects of the multipath time spread so that a frequency band much wider than $1/\tau$ can be transmitted requires information concerning the characteristics of the transmission channel so that they must be corrected by a matched filter technique. The information can be obtained by determining the distortion of a pilot signal of known amplitude and phase characteristics.

The analysis and correction of channel distortion entails delay and integration which is only feasible if the channel distortion changes slowly with time; in this case, the fading periods vary roughly from 10 per second to $\frac{1}{10}$ per second which is acceptable.

To perform its function, the pilot signal must be recognized and isolated. Since the time scatter spreads each impulse signal over an uncertainty interval $\tau$, isolation requires that a time gap equal to, or longer than, $\tau$ be cleared around the pilot signal. Recognition requires that the pilot signal, preferably a pilot pulse, be substantially larger than the information bearing pulses.

Let the pilot bandwidth be $f_p$ and hence, its duration about $$t_p=1/f_p$$

If this is spread out randomly over the interval $\tau$, its peak power is reduced on the average by a factor $\tau f_p$. This is not the case for the information signals that have no large average gaps. Hence, if the pilot power is $P_p$ and the signal power $P_s$ $$P_p<\tau f_p P_s$$

In spite of this higher peak, the average energy consumption of the pilot pulses need only be a small fraction of the signal energy, if the pilot pulses are separated by sufficient intervals. Such intervals are also required in order to minimize the fraction of time expended on the pilot pulses and the cleared time gaps adjoining them.

On the other hand, the intervals between pilot pulses must be small compared to the fading period so that the characteristics of the propagation channel remain reasonably constant over the integration time required for averaging and filtering several pilot pulses. The high peak power of the received pilot pulse, before detection, should not unduly increase the peak power of the transmitted output.

It is therefore a prime object of this invention to provide an improved method for increasing the data rate in transmission over time-varying multiple paths.

It is another object of this invention to provide a new and improved method of increasing transmission data rates by transmitting evenly-spaced pilot pulses which are separated from transmitted messages by isolation gaps.

It is a further object of this invention to provide a new and improved method for increasing the data rate of transmissions by interspersing evenly-spaced pilot pulse signals and analyzing the complex frequency characteristics of the received pilot pulses.

It is still another object of this invention to provide a method for overcoming the garbling effects of multipath time spread, thereby permitting a much wider frequency band to be transmitted.

These and other advantages, features and objects of the invention will become more apparent from the following description taken in connection with the illustrative embodiment in the accompanying drawings, wherein.

Figure 1:
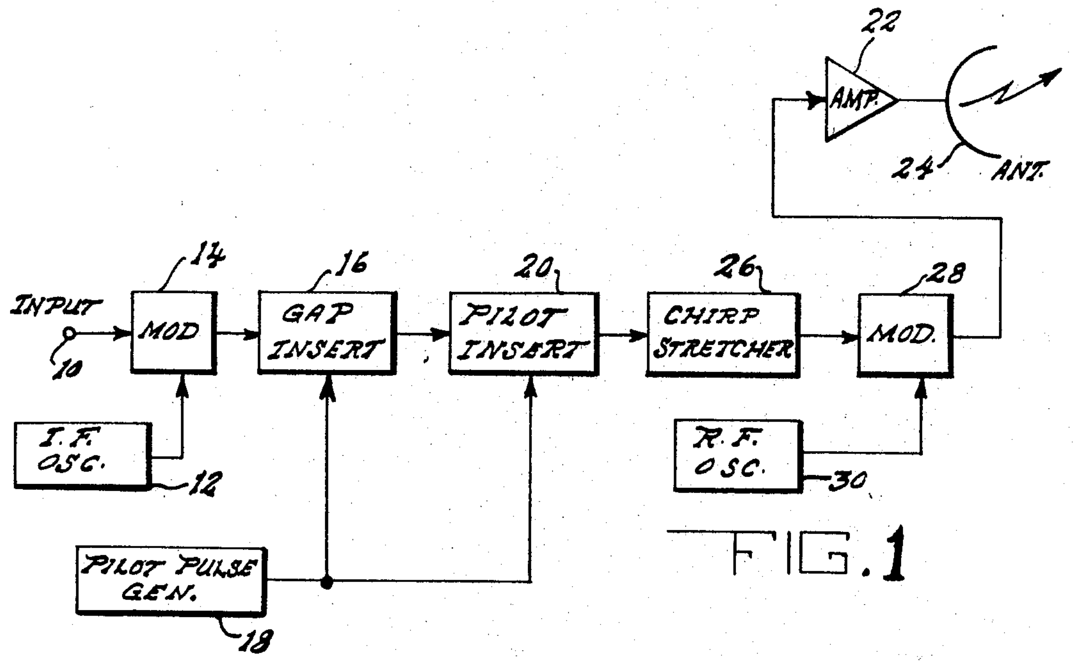
FIG. 1 is a block diagram of a transmitter utilized by this invention.

Referring now to FIG. 1, a message input 10 is sent to the transmitter where the intermediate frequency oscillator 12 modulates the signal 14, the signal then has a gap inserted at 16 by the pilot pulse generator 18 which further inserts in the gap a pilot pulse 20. Before reaching the transmitter output at 22 and 24, the pulse shape is flattened by a dispersive "chirp" pulse stretcher 26. The signal then goes from the intermediate frequency to the modulator 28 where it is acted on by the ratio frequency oscillator 30 and sent to the amplifier 22 and transmitted through the antenna 24.

Figure 2:
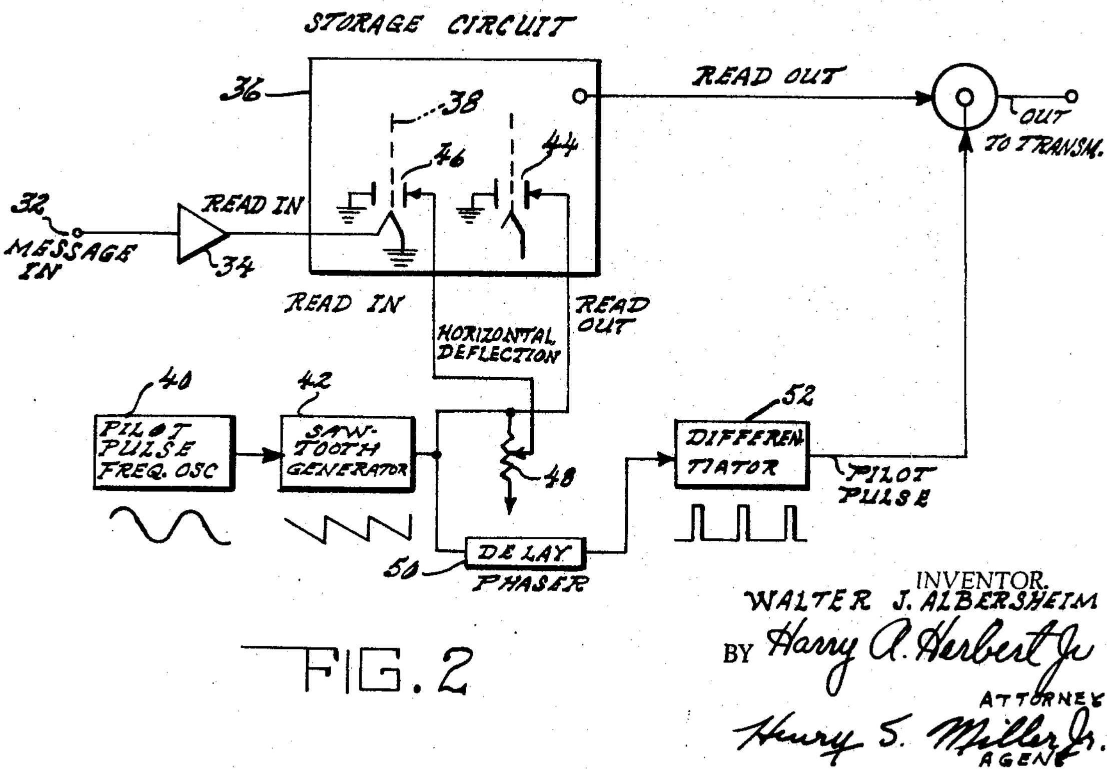
FIG. 2 is a circuit schematic of a means for inserting the gap and pulse according to this invention.

The gap and pulse may be inserted by a sawtooth beam as shown in FIG. 2. The message signal enters from the modulator 14 at 32, is amplified at 34 and enters a storage tube 36. This signal controls the grid 38 of the read in beam. The pilot pulse from the frequency oscillator 40 enters the sawtooth generator 42 where the output is sent to the plate of the readout beam 44. The horizontal deflection signal to the plate 46 of the read-in beam is taken through a variable resistor 48 from the sawtooth generator 42. The output of the sawtooth generator 42 is simultaneously fed to a delay phaser 50 which causes a pilot pulse from the differentiator 52 to be inserted in the message gap. The readout from the storage circuit and the pilot pulse are combined as shown representatively in FIG. 1 and then sent to the transmitter. The signal is then propagated over multiple paths through the troposphere.

The method of arranging the transmitter input signal so as to provide the periodic isolation gaps and pilot pulses and to correspondingly eliminate these gaps from the receiver output is best seen by the following example.

If the input itself contains periodic gaps, such as a black and white TV signal that has gaps at the return of every line scan, at the rate of 15,750 lines p.s. the time between lines is 63.5 μsec. so that a pilot pulse insertion after every third line approximates a 160 μsec. interval which is desirable for this system.

If the input is continuous, such as a quasi-random series of equal pulses, the rearrangement can be made by means of a storage tube with separate read-in and read-out beams. As a further example, if the duration of a pulse symbol is 0.32 μsec. and the storage surface is 8 inches wide and the read-in beam has a "sawtooth" motion, advancing 7.5 in about 160 μsec. and returning nearly instantaneously in a small fraction of a microsecond, to the next line then each line contains 500 pulse symbols. The read-out beam follows a similar sawtooth path with the same repetition rate but with an excursion of the full 8 inches. The read-out compresses each group of 500 pulses into 150 μsec. and scans a void in the remaining 16 μsec., thus generating the gap. The rapid "snap-back" of the sawtooth scan is avoided if the read-in beam traces one 7.5" line with uniform velocity in 80 μsec. and returns with the same velocity in the next line, so that the 160 μsec. gap interval covers two lines. The read-out beam follows the same "triangular" pattern but with an excursion of 8.0″. Thus the gap is inserted in the center of each back-and-forth motion.

Figure 3:
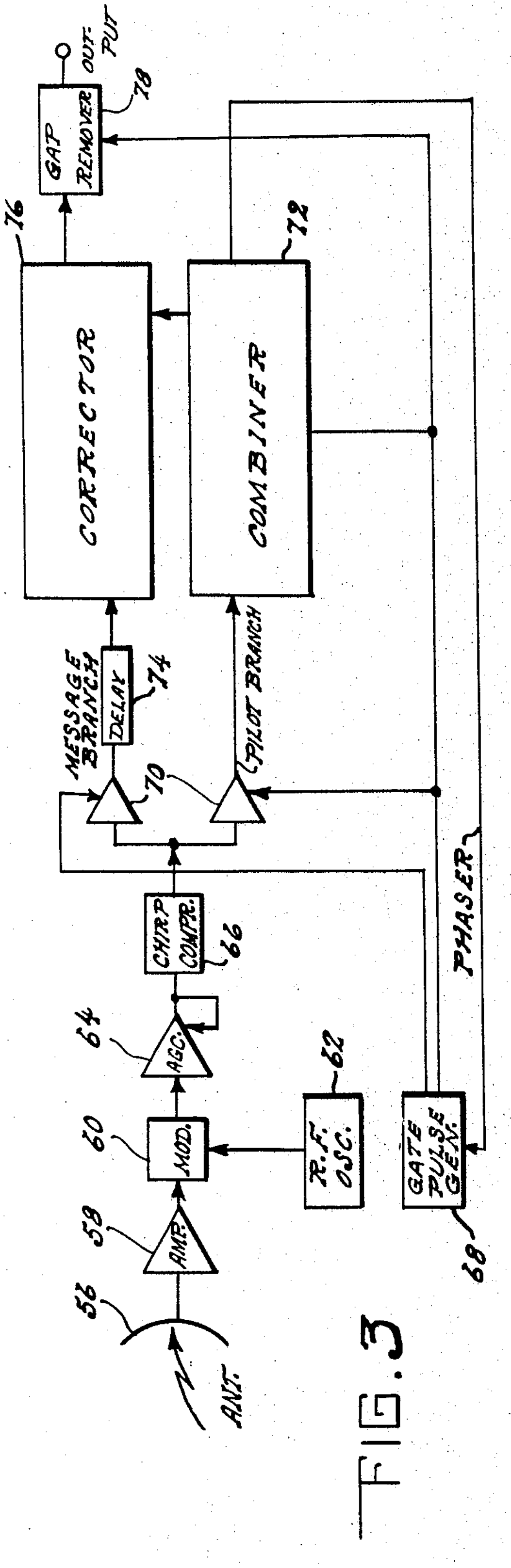
FIG. 3 is a block diagram of a receiver used according to the method of this invention.

FIG. 3 is a schematic block representation of a receiver which would be utilized in conjunction with the transmitter hereinbefore described. The signal is received by the antenna 56, amplified at 58 where the radio frequency oscillator 62 modulates the signal at 60. The signal then flows to the automatic gain control section 64 with appropriate feedback to prevent excessive gain from entering the "chirp" compression network 66. The "chirp" compression network is matched to the "chirp" stretcher of the transmitter and annuls the "chirp" dispersion. Since pulse stretching, multipath distortion and pulse recompression are linear operations, the result is the same as if their order was changed so that the pulse stretching is immediately corrected or annulled by the pulse compression, the result being that the "chirp" networks lower the peaks of the transmitter output but restore them at low receiver levels. The amount of pulse stretching depends upon the message and frequencies used. However, the pilot pulse is completely smeared out if it is stretched over the entire pilot repetition period.

Referring again to FIG. 3, the recompressed pulse sequence, still distored by multipath transmission, is divided into two branches, one of which serves as pilot branch to establish the required multipath correction, the other serves as an information branch where the correction is carried out.

The pilot pulse and the message are separated by gating from the gate pulse generator 68. Since isolation gaps are transmitted at constant intervals, gating pulses of the same length as the isolation gaps are generated in the oscillator with the same period. In the pilot branch, the gate is opened during isolation intervals. The exact timing of the gating pulses is adjusted by a servo circuit, hereinafter described, by maximizing its energy content. The same gating pulses with reversed polarity, suppress the pilot pulses in the information channel. The time constant of the gating servo may be of the order of the fading period or even longer, since the time spread of the multipath transmission changes less than the phase of its components. In the figure, the signal from the gate pulse generator is sent to the gain controlled amplifiers 70. The signal in the pilot branch is sent directly to the combiner 72. The message branch is delayed by the mean delay 74 of the pilot band pass smoothing filters, so that the corrections derived from the pilot branch are applied to approximately simultaneous signals in the message branch. The signal reaches the correction network 76 from which it is sent to the gap remover 78 and out of the receiver.

Figure 4:
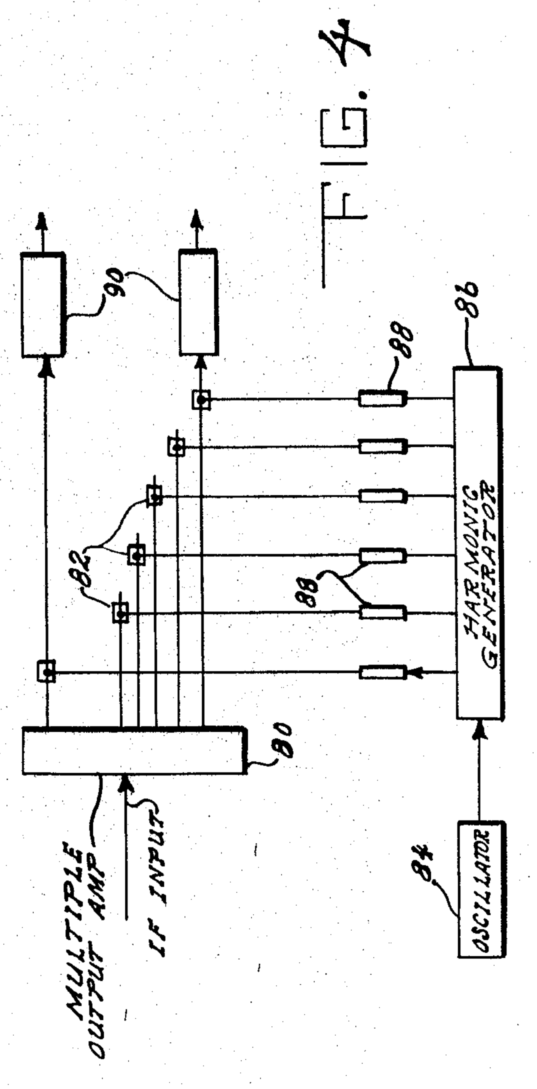
FIG. 4 is a block diagram of a uniform filter bank utilized in the receiver according to this invention.
Figure 5:
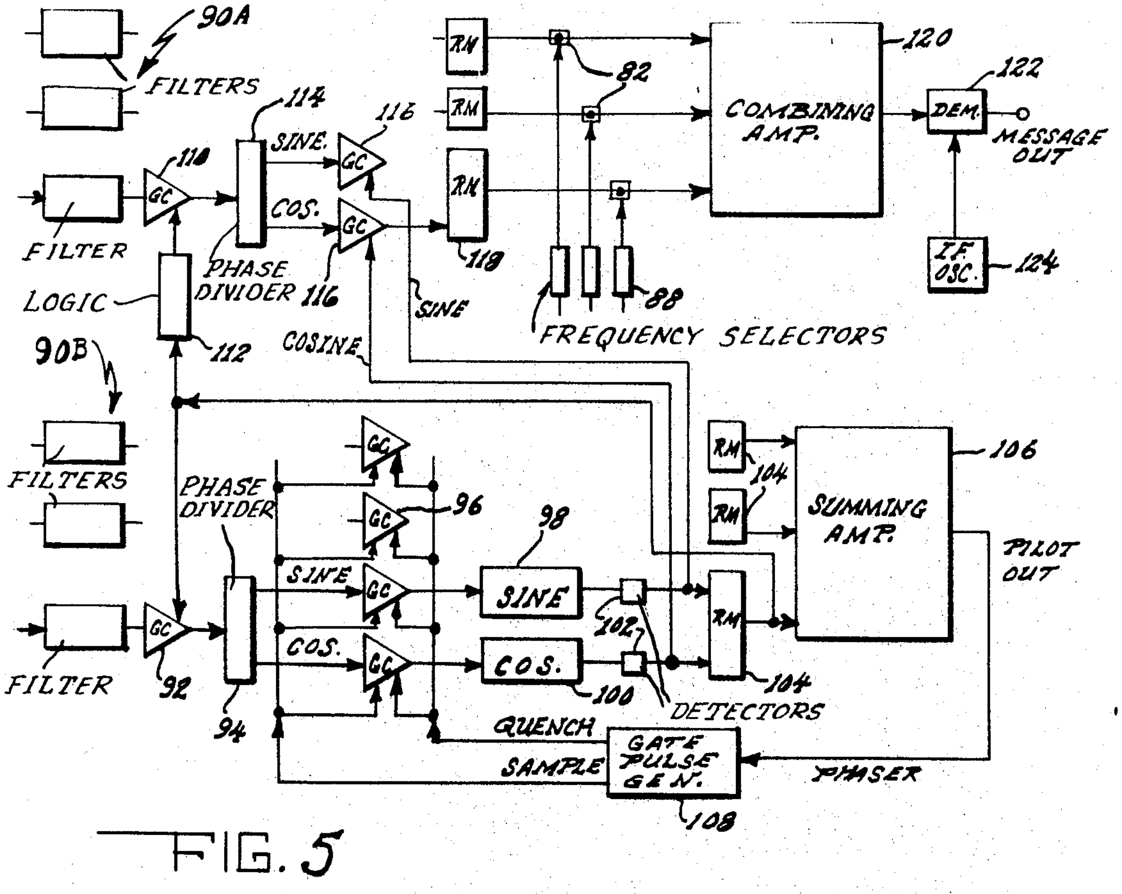
FIG. 5 is a detailed block diagram of the correction circuit used in the receiver by this invention.

Discussing now more fully FIG. 3, reference is made to FIGS. 4 and 5 where the analysis and correction of the received signal is carried out in the frequency domain. The spatial grouping of scatters constitutes a transmission circuit with a slowly-varying amplitude and phase characteristic, which operates on all input signals. "Real time" frequency analysis can be carried out by subdividing the pilot branch into many contiguous band pass filters, the totality of which covers the entire pilot band.

The intermediate frequency enters a multiple output amplifier 80 which has an output for "N" frequencies depending upon the number to be analyzed; the outputs of the amplifiers are sent to sum frequency modulators 82. The oscillator 84 emits a signal dependent upon the change in the frequencies desired to be corrected. A harmonic generator 86 receives the signal from the oscillator and sends it through a plurality of frequency selectors 88 which determines the frequency to be modulated. The intermediate frequency signal is then sent to band pass filters 90.

An illustration of the above disclosed filter is seen if one requires that the phases of all frequency components within a filter passband should be adjusted within $\pm\Delta\phi$, the phase variation over the filter band should be $<2\Delta\phi$ and the band width $$f \doteq < \frac{\Delta\phi f_c}{\pi\tau}$$

Assuming $\Delta\phi = 45° = \pi/4$ $$\Delta f \leq \frac{\pi}{4} \leq 25 \text{ kc.}$$

Choosing $\Delta f = 25$ kc., requires $n = 240$ filters, preferably of equal bandwidth, equal time delay and small delay distortion over their pass band. These requirements can be most easily satisfied by making all filters identical. The signal pass bands are shifted in steps of 25 kc. by heterodyning with frequencies stepped 25 kc. This comb spectrum of beat frequencies may be generated as harmonics of a single crystal-controlled pulse generator. Each filter is "charged" during the gating periods, that is during the reception of successive, distorted pilot pulses.

In FIG. 5 the signals enter the combine (72 and 76) through the band pass filters, 90A for the message branch of $n$ channels and 90B for the pilot branch of $n$ channels. The twin outputs of each filter in the message branch pass through individual multipliers. Each filter in the pilot branch has individual automatic gain controlled amplifiers 92. Controlling is done by means of the root mean square 104 of the sine and cosine outputs 98 and 100 taken through the detectors 102. The twin outputs are fed into the quadrature phase dividers 94 which sends the signal to the gain controlled amplifier 96, one amplifier is for the sine and one for cosine. Since each filter is charged during the gating period as aforementioned, the interval between these charging periods is long enough to permit sampling of the filter outputs and quenching of the filters. This is done by taking the root mean square of the sine and cosine outputs 104, summing them through the summing amplifier 106 and injecting a pulse to the gate pulse generator 108. The pulse generator sends "sample" and "quench" pulses to the filters. In order that all frequency components are combined with their true transmitted amplitudes, the differential frequency fading must be compensated or corrected as closely as noise permits. In order to do this, a control amplifier 110 must be provided at the input of each filter in the message branch. This control amplifier is matched in design and control characteristics to the automatic gain controlled amplifier in the corresponding filter of the pilot branch. By applying the AGC bias generated in the pilot branch control amplifier of the information branch, the overage output compensates for the multi-path distortion and regenerates the transmitted wave shape except for some distortion by noise. In addition, there s a logic circuit 112 in the message branch which switches to a negative cut-off bias, when the AGC bias of the pilot branch exceeds a critical value. The message signal passes from the gain controlled amplifier 110 to the quadrature phase divider 114 where the sine and cosine is fed into the gain controlled amplifiers 116, and where they are compared with the sine and cosine from the pilot branch. The ratio of the sine and cosine components in the pilot branch is the tangent of the mean phase angle, and their root mean square is the mean amplitude transmission in the filter band.

The message signal then goes to the uniform filter bank shown in detail in FIG. 4 where the root mean square combiner 118 sends the signal to the sum-difference frequency modulator which receives a beat frequency from the frequency selector 88 whereby the signals of different frequencies are sent to the combining amplifier 120 and hence to the demodulator 122 where it is combined with a signal from the IF oscillator 124 and enters the gap remover 78, shown in FIG. 3.

Figure 6:
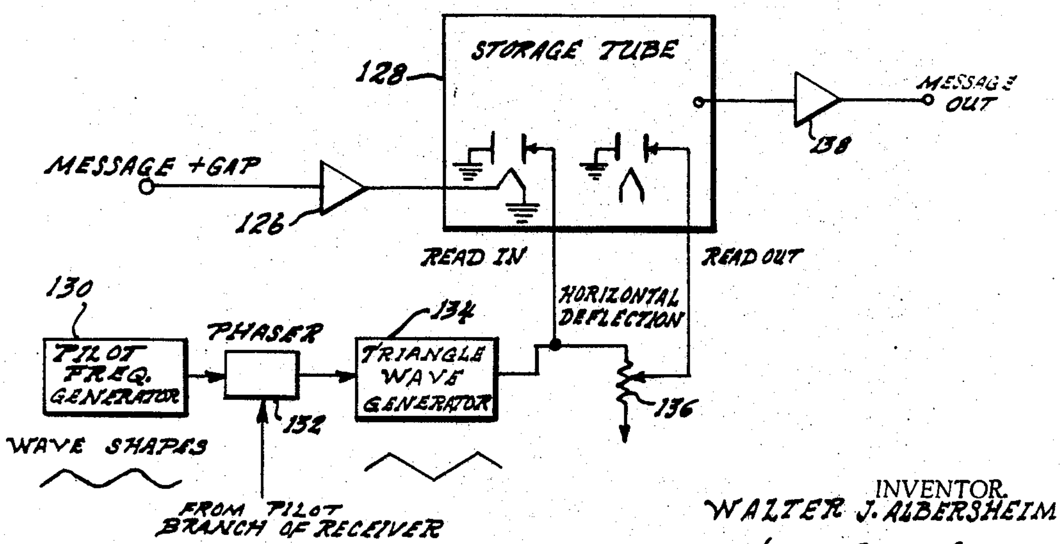
FIG. 6 is a circuit schematic of one aspect of the receiver systems of the invention.

The gap is removed from the transmission in the gap remover 78 of FIG. 3, as shown in more detail in FIG. 6. The removal of the gap at the output of the information branch is the inverse procedure of inserting the gap. The message and gap from the message branch of the receiver enters the amplifier 126 which controls the read-in beam intensity of the storage tube 128. The output (read-in) is read onto the full face of the storage tube, for example eight inches. A sawtooth or triangular beam is phased to place the gap at one edge of the storage tube. This is performed by means of the pilot frequency generator 130 which sends a signal to the phaser 132 which reveics a signal from the pilot branch of the receiver and sends the signal to the triangle wave generator and hence to the horizontal deflection circuit of the storage tube. The pulse sequence is read-out by a synchronous beam with a shorter excursion of say only seven and one-half inches, thus, omitting the gap and restoring an unbroken series of mark or space pulses. This is accomplished through the variable resistor network 136 to the read-out horizontal deflection plates. The read-out beam intensity then flows through the amplifier 138 and the message as originally transmitted.

Although the invention has been described with reference to a particular embodiment, it will be understood to those skilled in the art that the invention is capable of a variety of alternative embodiments within the spirit and scope of the appended claim.

I claim:

1. A method of increasing the message rate in communication transmissions over multiple paths comprising the steps of: modulating the messages a first time; inserting a gap between successive messages; inserting a pilot pulse in said gap; flattening the pulse shape of said pilot pulse; modulating said messages a second time; and transmitting said messages; receiving the transmission; modulating the received signals; controlling the gain of the modulated signals; restoring said flattened pilot pulse to its original shape; separating the transmission into a message branch and a pilot branch; said pilot branch establishing a correction factor and said message branch applying the correction factor to the transmission; removing the gap; and sending the message to an output.

References Cited

UNITED STATES PATENTS

| | | | |
|---|---|---|---|
| 2,757,239 | 7/1956 | Patton | 333—15 |
| 2,964,589 | 12/1960 | Walker. | |
| 3,283,063 | 11/1966 | Kawashima | 325—65 |

FOREIGN PATENTS

| | | | |
|---|---|---|---|
| 109,000 | 11/1938 | Australia. | |

ROBERT L. GRIFFIN, Primary Examiner

A. J. MAYER, Assistant Examiner